United States Patent Office 3,684,603
Patented Aug. 15, 1972

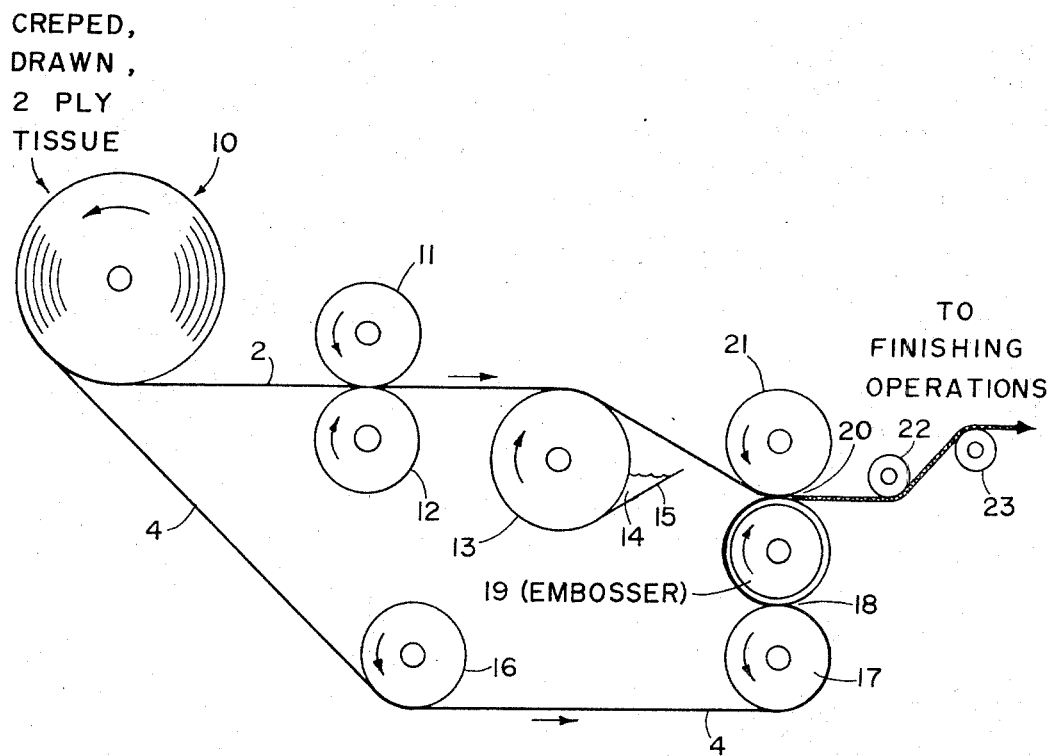
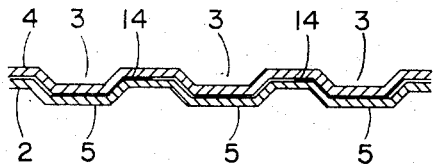
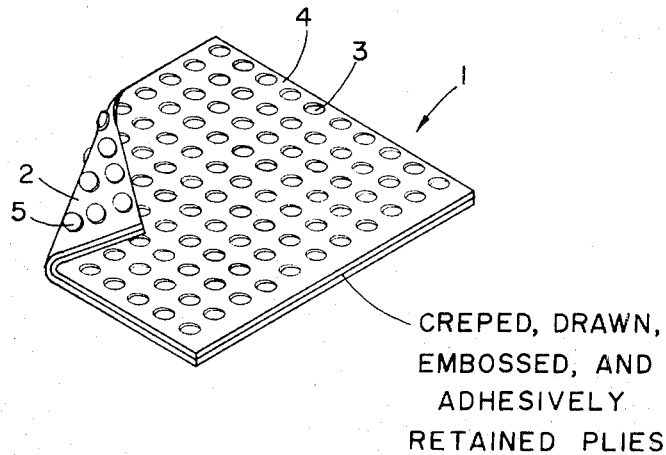

3,684,603
METHOD OF MAKING A TWO-SIDED TOWEL
Charles O. Iltis, Neenah, Wis., assignor to Kimberly-Clark Corporation, Neenah, Wis.
Original application Nov. 9, 1967, Ser. No. 681,794. Divided and this application Apr. 6, 1970, Ser. No. 25,933
Int. Cl. B32b 31/00
U.S. Cl. 156—152
4 Claims

ABSTRACT OF THE DISCLOSURE

Two-ply paper toweling having one relatively rough and one relatively smooth outer side, the plies being retained together by a combination of randomly distributed adhesive and a mechanical embossing action, and the plies being of relatively low stretch creped cellulosic wadding tissue. A method of plying the paper tissues into absorbent, soft, comfortable, relatively strong and abrasion resistant toweling in which one ply is pre-embossed and carried by the embossing element without removal into adhesive contact with a relatively smooth unembossed ply for embossing as a unit. The smooth ply carries the adhesive, preferably in discrete zones, and the adhesive bonding between plies is then very limited because it occurs primarily where peaks of the pre-embossed sheet contact the discrete adhesive zones of the unembossed sheet.

This application is a divisional application of my copending application Ser. No. 681,794, filed Nov. 9, 1967.

BACKGROUND OF THE INVENTION (1) Field of the invention

This invention relates to paper toweling and is particularly concerned with cellulosic wadding towels which are two-sided.

(2) The invention with relation to the prior art

Creped cellulose wadding towels have been employed for many years. The towels commonly are of a one or two ply construction and vary in basic physical factors such as basis weight, stretchability and surface texture with the specific purpose for which the toweling is intended. One well-known two-ply toweling is two-sided, that is, has its oppositely disposed sides of different degrees of smoothness; also, the rougher side carries protruding embossments and the degree and nature of embossing is such that a binder or adhesive between plies is not necessary. While such a structure provides a limp towel and is advantageous in many respects for some purposes, a similar towel of a greater degree of softness and which is less compacted and has less tendency to ball up when wetted is frequently desired. It is one object of this invention to provide a two-sided toweling having properties providing for the attainment of the latter mentioned characteristic; it is another object of this invention to provide a novel method of obtaining toweling.

BRIEF DESCRIPTION OF THE DRAWINGS

The invention will be more fully understood by reference to the following detailed description and accompanying drawings wherein:

FIG. 1 is a schematic view with web travels shown of an apparatus arrangement for manufacturing toweling in accordance with the invention;

FIG. 2 is a view of toweling material in accordance with the invention and showing the opposed sides of the material; and FIG. 3 is an enlarged and idealized view illustrating the arrangement of the web plies and adhesive in the product.

Referring to the drawings, the numeral 1 in FIG. 2 generally designates two-ply toweling material in accordance with the invention. The upper ply or web 4 (FIG. 2) on its exposed and uper surface in the figure has a great plurality of depressions 3 resulting from the embossing operation to be described hereinafter. The lower (FIG. 2) ply or web 2 on its exposed surface has a plurality of protuberances 5, each protuberance corresponding to a depression in the upper ply 4.

The webs 2, 4 each are of a strong wet-strength containing dry creped and drawn tissue paper having a relatively low stretch characteristic. The dry creped tissue is relatively soft due to the low fiber to fiber bonding and the effect of drawing following creping is to reduce the stretch of the web while retaining the softness. The stretch of the sheet due to the crepe structure, as fed to the embosser, is about 20 to 35% of the sheet length and is in contrast to the known previously mentioned two-sided product which exhibits a stretch of 50% or more. Also, in contrast to the known product, the web is less limp however. The stretch of the sheet at break is somewhat greater, about 5 to 10%, than the stretch due to the crepe structure but is a less significant figure in the practice of the invention.

The plies of the product of FIG. 2 may be formed from any of the conventional paper furnishes used in the manufacture of tissue papers. The crepe ratio imparted is suitably in the range of 1.5 to 3 and the single ply web weight is desirably between about 10 and 16 lbs. per 2880 sq. ft.; webs of between about 12 and 14 lbs. per 2880 sq. ft. are preferred. The pulp itself may be kraft, sulfite or other chemical wood pulps, and proportions of groundwood may be included if the sheet strength is suitably maintained and if the presence of a degree of lint can be tolerated. The wet strength of the webs should be at least about 30 to 40% of the dry strength and for this purpose conventional wet strength agents may be incorporated in the web.

The webs 2, 4 (FIG. 2) are retained together not only by the effect of the embossing action on the superposed plies but by adhesive applied to at least one of the webs. This adhesive is preferably deposited in predetermined amounts in discrete, very thin, elongated (FIG. 3) zones on the smooth unembossed surface of the web 2, and the adhesive is contacted by some of the protuberances of the web 4 so that the webs are lightly retained together. The protuberances of web 4 also tend to some extent to be bonded to the web 2 by the embossing pressure, that is, there is a simple mechanical attachment. The adhesive commonly will be primarily effective where peaks of the pre-embossed web contact the adhesively treated sheet but the adhesive 14 (FIG. 3) will also to some extent lie between flat areas of the plies and on sides of the crepe areas.

The adhesive in the finished product is well taken up by the cellulose, does not apparently stiffen the product, is preferably colorless, not visible to the eye and only apparent when the two webs are carefully separated. Then, the tendency of the webs to adhere in well spaced discrete spots is readily noted. The total amount of adhesive applied is dependent upon the particular adhesive, the amount deposited in each zone, and the number of zones per unit area of web but should be sufficient to insure that the webs may be adequately bonded for manufacturing operations, packing, shipping and general use without separation. Application of adhesive in discrete zones is desirable to minimize cost and to inhibit against possible product stiffening but is not critical to the attainment of a useful product. Any of a number of adhesives may be used such as polyvinyl acetate emulsion adhesive, polyvinyl alcohol aqueous solutions, synthetic latices, oil soluble adhesives and the like. The adhesives may be water-resistant or water-dispersible as desired, non-rigid film forming and do not deleteriously affect product characteristics when used in small amounts.

Referring now to FIG. 1, the numeral 10 designates a rolled sheet of two-ply tissue paper which is a creped, drawn sheet. As illustrated, the webs 2, 4 are separately formed from the rolled two-ply sheet and are directed in separate paths to treating equipment.

Web 2 is directed over one or more guide rolls such as indicated at 11, 12. Suitably roll 11 may be a Mt. Hope roll serving to spread web 2 as it moves toward adhesive applicator roll 13. The rolls 11, 12 serve to present the web at a predetermined fixed angle to roll 13. Roll 13 is preferably an intaglio roll and is supplied with a fluid adhesive 14 in pond 15 as the roll rotates in the direction indicated by the arrow. The contact of web 2 with intaglio roll 13 is held to a small angle, from the approximately tangential (0°) to not more than about 30°. Also, roll 13 is rotated at a slower peripheral speed than the lineal speed at which web 2 is moving so that the web wipes the adhesive from the roll in longitudinally spaced strips.

The web 4 passes over guide roll 16 and is directed around a relatively soft rubber covered roll 17 to nip 18. The nip 18 is formed between the rubber covered roll 17 and a hard male embosser roll 19 of steel. The rubber covered roll has a softness (P&J of 180 or greater) such that it will, in large measure, fill in the spacings between protuberances of the hard male patterned roll; the protuberances suitably each have the shape of a frustum of a cone and is conveniently termed a "dull pin" embosser. In specific application the pins are about 1/8" apart on centers and the embossment peaks are about 1/32 to 1/16" diameter.

The web 4 carried by the pins passes from nip 18 to nip 20 formed by embosser 19 and soft rubber covered roll 21 serving as a combining roll and embossing roll. Roll 21 (and roll 17) suitably has a Shore Durometer A of about 25 to 40 or a P&J of between about 180 and 300. The adhesive-carrying web 2 is united with the pre-embossed web 4 on the pins or teeth of the embosser roll 19. The web 4 is itself subjected to two embossing actions. The first and sole embossing mechanically works the web 4 making it more soft and conformable; additionally, the first embossing reduces the amount of pressure and energy needed in nip 20 to attain a given degree of embossing of the two superposed plies. That is, a deeper embossing may be effected with less horsepower and less wear on the rolls of the device. Also, since the projections of the pre-embossed web bear against a smooth adhesively treated creped surface of web 2, the extent of adhesive contact is limited in the assembly of the plies during the second embossing of web 2.

The toweling material leaving the nip 20 passes over guide rolls 22, 23 to the usual finishing operations in conventional manner and generally is perforated, wound, slit, packaged and the like at common manufacturing speeds.

In general, I prefer to use as the webs 2, 4 tissue paper having a basis weight per 2880 sq. ft. of 10 to 16 lbs. per ply, the webs containing a wet strength resin which may be a melamine formaldehyde, urea formaldehyde or the like; the adhesive is, in my preferred embodiment, a polyvinyl alcohol applied at a web speed of 1000–1500 f.p.m. at an applicator roll speed of about 300 to 500 f.p.m., only about 0.03 to 0.07 of a pound of the adhesive being required per 2880 sq. ft. of finished product. Such adhesive then commonly covers only about 3 to 5% of the towel area. Importantly, the stretch in the finished product is commonly low, as low as 15% due to the drawing out of the crepe; a stretch of up to about 25% serves the purpose well. Under this condition there is much less tendency of the toweling to ball when wetted.

As many apparently widely different embodiments of this invention may be made without departing from the spirit and scope thereof, it is to be understood that I do not limit myself to the specific embodiments thereof except as defined in the appended claims.

I claim:

1. In a process in which creped, drawn cellulosic wadding webs are embossed in superposed relation, the steps initially of adhesively treating a smooth unembossed surface of a first creped, drawn web, embossing another and second of the webs in a nip formed between a hard male embossing roll and a soft impression roll to provide protuberances on one side and corresponding depressions on the other side of the second web, carrying the second web without removal from the embosser roll to a nip formed between the embosser roll and a second soft impression roll, feeding the adhesively treated first web to the second nip with the adhesively treated surface fronting on the second web and embosser roll, and then embossing the pattern of the embosser roll into the superposed webs so that the embossed pattern of the second web is imparted to the plied and adhesively united webs.

2. The process according to claim 1 in which the first web is adhesively treated to provide the adhesive in discrete zones and some protuberances only of the second web are contacted with the adhesive of the first web in the second nip.

3. The process according to claim 2 in which the soft impression rolls of the two nips have a Shore Durometer A value of between about 25 and 40.

4. The process according to claim 2 in which the adhesive applied to the first web covers only about 3 to 5% of the web area.

References Cited

UNITED STATES PATENTS

| | | | |
|---|---|---|---|
| Re. 22,842 | 2/1947 | Hill | 156—291 X |
| 3,290,205 | 12/1966 | Goldstein et al | 156—291 X |
| 1,060,387 | 4/1913 | Wait | 101—23 |
| 3,556,907 | 1/1971 | Nystrand | 156—209 |

BENJAMIN R. PADGETT, Primary Examiner

R. E. SCHAFER, Assistant Examiner

U.S. Cl. X.R.

156—209, 183, 220, 324, 291, 247; 161—130, 131